(12) United States Patent
Strafer et al.

(10) Patent No.: US 12,524,135 B2
(45) Date of Patent: Jan. 13, 2026

(54) EXTENDED REALITY HUMAN MACHINE INTERFACE TO SIMULATE ACTUAL FLOW

(71) Applicant: ASCO Power Technologies, L.P., Florham Park, NJ (US)

(72) Inventors: Justin Strafer, Bridgewater, NJ (US); Steven Kelmelis, Pompton Plains, NJ (US); Sumeet Kumar, Whippany, NJ (US); Romain Gassion, Izeaux (FR)

(73) Assignee: ASCO Power Technologies, L.P., Florham Park, NJ (US)

( * ) Notice: Subject to any disclaimer, the term of this patent is extended or adjusted under 35 U.S.C. 154(b) by 236 days.

(21) Appl. No.: 17/980,269

(22) Filed: Nov. 3, 2022

(65) Prior Publication Data

US 2023/0052032 A1     Feb. 16, 2023

Related U.S. Application Data

(63) Continuation of application No. 17/362,402, filed on Jun. 29, 2021, now Pat. No. 11,573,686.

(51) Int. Cl.
*G06F 3/0484*     (2022.01)
(52) U.S. Cl.
CPC .................. *G06F 3/0484* (2013.01)
(58) Field of Classification Search
CPC .............................. G06F 3/0484; G06F 3/048
See application file for complete search history.

(56) References Cited

U.S. PATENT DOCUMENTS

2007/0129917 A1   6/2007   Blevins et al.
2007/0168065 A1*   7/2007   Nixon ................ G05B 19/0426
                                                       715/965

(Continued)

FOREIGN PATENT DOCUMENTS

EP      3239795 A1    11/2017

OTHER PUBLICATIONS

Extended European Search Report for European Patent Application No. EP22179226.0, dated Nov. 25, 2022.

(Continued)

*Primary Examiner* — Jeanette J Parker
(74) *Attorney, Agent, or Firm* — Wolf, Greenfield & Sacks, P.C.

(57) ABSTRACT

A method for applying extended reality to simulate an actual flow system, including receiving selection of simulated components of the actual flow system that are graphical elements, receiving component metadata for each simulated component that represents simulated component factors that affect the simulated flow from, through, or to the simulated component, receiving simulation connection metadata for each simulated connection between the simulated components that represents simulated connection factors that affect the simulated flow through the simulated connection, receiving actual data over time, simulating the flow over time through the simulated connections based on the actual data by applying a model using a set of operations to the actual data, the simulation component metadata, and the simulation connection metadata. The method further includes displaying via the extended reality user interface the three or more simulated components as connected by the simulated connections and the simulated flow.

20 Claims, 7 Drawing Sheets

(56) References Cited

U.S. PATENT DOCUMENTS

| | | | |
|---|---|---|---|
| 2007/0179768 A1* | 8/2007 | Cullick | E21B 43/00 |
| | | | 703/10 |
| 2012/0232870 A1 | 9/2012 | Devereux | |
| 2015/0106075 A1* | 4/2015 | Boys | G05B 17/02 |
| | | | 703/9 |
| 2020/0012272 A1* | 1/2020 | Miyake | G06F 30/20 |
| 2022/0075918 A1* | 3/2022 | McGregor | G06F 30/28 |
| 2022/0196512 A1* | 6/2022 | Allmaras | G06Q 10/06 |

OTHER PUBLICATIONS

Office Action from the European Patent Office for European Patent Application No. EP22179226.0, dated Oct. 30, 2023.

* cited by examiner

EXTENDED REALITY HUMAN MACHINE INTERFACE TO SIMULATE ACTUAL FLOW

CROSS REFERENCE TO RELATED APPLICATIONS

This application is a continuation of U.S. patent application Ser. No. 17/362,402, filed Jun. 29, 2021, which is incorporated by reference in its entirety.

TECHNICAL FIELD

The present disclosure relates to a health machine interface (HMI), and more particularly, to application of extended reality using an HMI to simulate actual flow of an actual flow system.

BACKGROUND

A Human Machine Interface (HMI) is an interface between a machine via the machine's processor and an operator. An HMI can display near real-time operational information using visual process graphics, such as to give meaning and context to process parameters of a system (which can include a plant or an asset of the plant), such as motor status, valve status, tank levels, pressure, vibration. One particular type of HMI is a flow-based HMI, which can be provided for controlling and monitoring a system having an associated flow, such as a flow of a fluid (liquid or vapor) or electricity. By translating complex process variables into usable and actionable information, an HMI can be used as a tool, such as by operators and line supervisors, to monitor, coordinate, and control industrial and manufacturing processes and machines.

Extended reality (XR), including augmented reality (AR), virtual reality (VR), and/or augmented virtuality (AV), can be integrated with an HMI, such as to provide a digital twin that models a system with which the human operator can interact. When building a flow-based HMI in XR, a customized script is generated to track and visually represent each segment of the system that potentially traversed by the flow. Each script can be individually designed and written to logically handle the flow in accordance with a flow diagram of the flow, accounting for every combination of possible conditions. The scripts are written using engineering and programming skills, with complexity of the scripts increasing as the size and/or complexity of the flow system being modelled increases. Furthermore, the scripts are prone to human error, including engineering, logic, and programming errors. When any aspect of the flow system is modified that affects the flow, the individual scripts potentially need to be updated to account for the modification. For example, when a component of the flow system changes status or is replaced, the associated flow diagram is affected and the scripts need to be updated to account for the change.

Change of status of a component of the flow system can occur during operation of the flow system while the flow is flowing (also referred to as "on the fly") Accounting for changes that can occur on the fly increases complexity of the scripts, the level of expertise needed for writing the scripts, and the chance of error.

While conventional methods and systems have generally been considered satisfactory for their intended purpose, there is still a need in the art for simplifying the process of developing an XR-HMI for a flow system that reduces resources used and level of expertise needed for development of the XR-HMI, reduces likelihood of introduction of human error into the XR-HMI, and is reliable, even as status of a component of the flow system changes, including when the status change occurs during operation of the flow system. The present disclosure provides a solution.

SUMMARY

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings. To achieve these and other advantages and in accordance with the purpose of the illustrated embodiments, in one aspect, disclosed is a computer-implemented method for applying extended reality to an actual flow system to simulate an actual flow of the actual flow system, wherein the method includes receiving via an extended reality user interface selection of three or more simulated components that are graphical elements configured to simulate corresponding actual components of the actual flow system, wherein at least one middle simulated component of the three or more simulated components is configured for the simulated flow to flow through the simulated middle component. The method further includes receiving via the extended reality user interface simulation component metadata for each of the three or more simulated components that corresponds to an actual component of the actual flow system, wherein the simulation component metadata for each simulated component of the three or more simulated components represents simulated component factors that affect the simulated flow from, through, or to the simulated component, wherein the simulated factors simulate actual component factors that affect the actual flow from, through, or to the corresponding actual component. The method further includes receiving via the extended reality user interface simulation connection metadata for each simulated connection between the three or more simulated components that corresponds to an actual conduit between the three or more actual components via which the actual flow potentially flows, wherein the simulation connection metadata for each simulated connections represents simulated connection factors that affect the simulated flow through the simulated connection, and wherein the simulated connection factors simulate actual connection factors that affect the actual flow through the corresponding actual conduit. The method further includes receiving actual data over time about at least one of the actual component factors of the three or more actual components, the actual connection factors of the actual conduits between the three or more components, and the actual flow. The method further includes simulating the flow over time through the simulated connections based on the actual data by applying a model using a set of operations to the actual data, the simulation component metadata, and the simulation connection metadata. The method further includes displaying via the extended reality user interface the three or more simulated components as connected by the simulated connections and the simulated flow.

In one or more embodiments, the extended reality user interface can include a graphical user interface (GUI).

In one or more embodiments, a simulated source component of the three or more simulated components can correspond to an actual source component of the three or more actual components that is a source of the actual flow, and the simulation component metadata of the simulated source component can represent characteristics of the flow sourced from the actual source component and actual factors that affect the flow from the actual source component.

In one or more embodiments, the simulation component metadata for each simulated component can include status of the component as closed or open with regards to the flow, flow connections between components, data bindings for binding the actual data to the component, and/or information about associated equipment.

In one or more embodiments, the simulation connection metadata for each simulated connection can include direction of the potential flow through the connection and rate of flow of the potential flow through the connection.

In one or more embodiments, simulating the flow can include determining rate and direction of the simulated flow along each simulated connection included in a path of the simulated flow and/or a source type of the flow for the simulated connection.

In one or more embodiments, the operations are based on at least one of mathematical operations, machine learning operations, statistical operations, and artificial intelligence operations.

In one or more embodiments, the method can further includes receiving updates to the simulation component metadata and/or the simulation connection metadata while simulating the flow.

In one or more embodiments, receiving the selection of the three or more simulated components can include detecting a user selection from a library of available components provided via the GUI, wherein receiving the simulation connection metadata for one of the simulated connections between two of the simulated components can include detecting a user action via the GUI that connects the two simulated components.

In one or more embodiments, the real time data can be received in real time via an interface with the actual flow system or the real time data is received as playback data.

In accordance with aspects of the disclosure, a computer system is provided that performs the disclosed method. In accordance with further aspects of the disclosure a non-transitory computer readable storage medium and one or more computer programs embedded therein is provided, which when executed by a computer system, cause the computer system to perform the disclosed method.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

A more detailed description of the disclosure, briefly summarized above, may be had by reference to various embodiments, some of which are illustrated in the appended drawings. While the appended drawings illustrate select embodiments of this disclosure, these drawings are not to be considered limiting of its scope, for the disclosure may admit to other equally effective embodiments.

Identical reference numerals have been used, where possible, to designate identical elements that are common to the figures. However, elements disclosed in one embodiment may be beneficially utilized on other embodiments without specific recitation.

DETAILED DESCRIPTION

Figure 1:
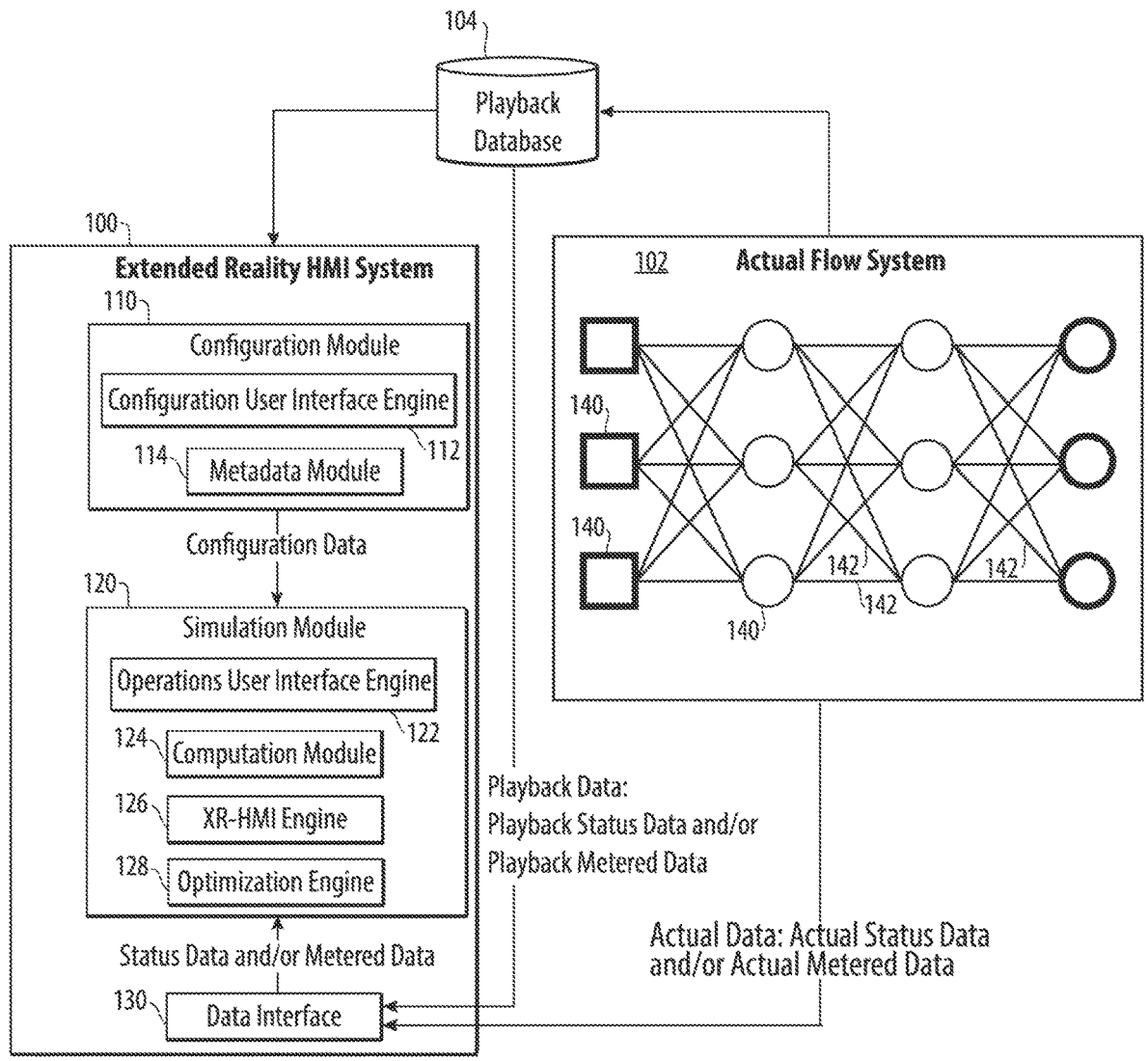
FIG. 1 is a block diagram illustrating an example extended reality (EER) human-machine interface (HMI) system communicating with an actual flow system, in accordance with embodiments of the disclosure.

Reference will now be made to the drawings wherein like reference numerals identify similar structural features or aspects of the subject disclosure. For purposes of explanation and illustration, and not limitation, a schematic diagram of an exemplary embodiment of an extended reality (ER) human-machine interface (HMI) system in accordance with the disclosure is shown in FIG. 1 and is designated generally by reference character 100. Other embodiments of an ER HMI system in accordance with the disclosure, or aspects thereof, are provided in FIGS. 2-7, as will be described.

XR-HMI system 100 is a computing system that includes a configuration module 110, a simulation module engine 112, and an actual data interface 130. XR-HMI system can be coupled to an actual flow system 102 or a playback database 104.

Configuration module 110 includes a configuration user interface (UI) 112 and a metadata module 114. Configuration UI engine 112 provides a UI that is used by a configuration operator to configure a flow diagram for an XR-HMI for modeling a particular flow system, such as actual flow system 102. In one or more embodiments, configuration UI engine 112 provides a configuration graphical user interface (GUI), as illustrated and described with reference to FIG. 2, which the configuration operator can interact with for configuring and viewing the flow diagram. Metadata module 114 generates metadata based on deductions about the flow diagram as configured, such as based on flow connections between a component of the flow diagram and one or more other components, status of the component as closed or open with regards to the flow, data bindings for binding the component to read and/or correlate real time data to the component, and/or information about associated equipment, such as the designated name, model, or manufacturer.

Data interface 130 provides an interface for receiving actual data from actual flow system 102 or playback data from playback database 106, wherein the playback data is stored data from an actual scenario of actual operation of the actual flow system 102 or of a simulated scenario. The actual flow system is represented as components 140 and connections 142 between components 140. The actual data can include actual status data about status, while operating, of the components 140 or connections 142 and/or actual metered data that includes measurements of the actual flow along its path(s) during operation. The playback data can include playback status data about status of the components 140 or connections 142 during playback and/or playback metered data that includes measurements of the flow along its path(s) during playback. The actual and playback metered data can respectively represent one or more paths, direction, source of, and velocity of a flow as actually measured in real time or in as measured in playback of the an actual or simulated scenario.

Simulation module 120 includes an operations UI engine 122, a computation module 124, an XR-HMI engine 126, and an optimization engine 128. During operation of actual flow system 102 or simulation playback as received from playback database 104, simulation module 120, generates a dynamic XR-HMI based on computations applied by computation module 124 to configuration data received from configuration module 110 and input, actual, or playback status information received from operations UI 122, actual flow system 102, or playback database 104, respectively.

Operations UI engine 122 enables an operations operator to input updates to the status of components 140 and connections 142 of the flow diagram and dynamically displays the XR-HMI as updated by computation module 124. Status updates input by the operations operator are provided by operations UI engine 122 to computation module 124 as input status data. The operations operator can interact with the XR-HMI as displayed to view or update information. For example, the operations operator can access a component 140 (e.g., right click on the component 140) and change its status, causing a simulation of this change. The operations operator can then observe a simulated consequence of the changed component status on the flow throughout the actual flow system (with the simulated change).

Operations operator can also visualize live values in XR associated with the actual flow. The displayed flow can graphically change, such as by changing color, to show a change in status of the actual flow. Operations operators can ask to be guided to certain parts of the displayed flow that have changed status. Guiding the operations operator can include, for example, providing an alert about, identification of, and/or a view of sections of the displayed flow that have changed status.

XR-HMI engine 126 receives configuration data, including the flow diagram and associated metadata, from configuration module 110 and initial status information received and outputs an XR-HMI to computation module 124. Output form XR-HMI engine 126 can be displayed an operations GUI that can be viewed by an operations operator, which is described in greater detail with respect to FIG. 3.

Computation module 124 is configured to process the XR-HMI by applying mathematical operations that are based on logic to the configuration data and each different possible combination of status conditions (input, actual, and/or playback) associated with the components 140 and connections 142 of the flow diagram to simulate the flow along simulated path(s). Computation module 124 receives updated input status data, actual status data, and/or playback status data and applies computations in real time to the XR-HMI to determine one or more paths, direction, source of, and velocity of the flow, providing a flow simulated by the XR-HMI. Computation module 124 can further or alternatively process the XR-HMI by using, for example, machine learning operations, statistical operations, and/or artificial intelligence operations, including operations developed in the future.

Optimization engine 128 can display the simulated flow, which is an expected flow based on current status data. Optimization engine 128 can also display a flow timeline history based on the playback metered data. Optimization engine 128 stores status differences in flow status between the simulated flow and the timeline history, and uses the status differences to simulate the actual flow. Optimization engine 128 can use this flow timeline to understand, diagnose, and/or optimize actual flow system 102.

Figure 2:
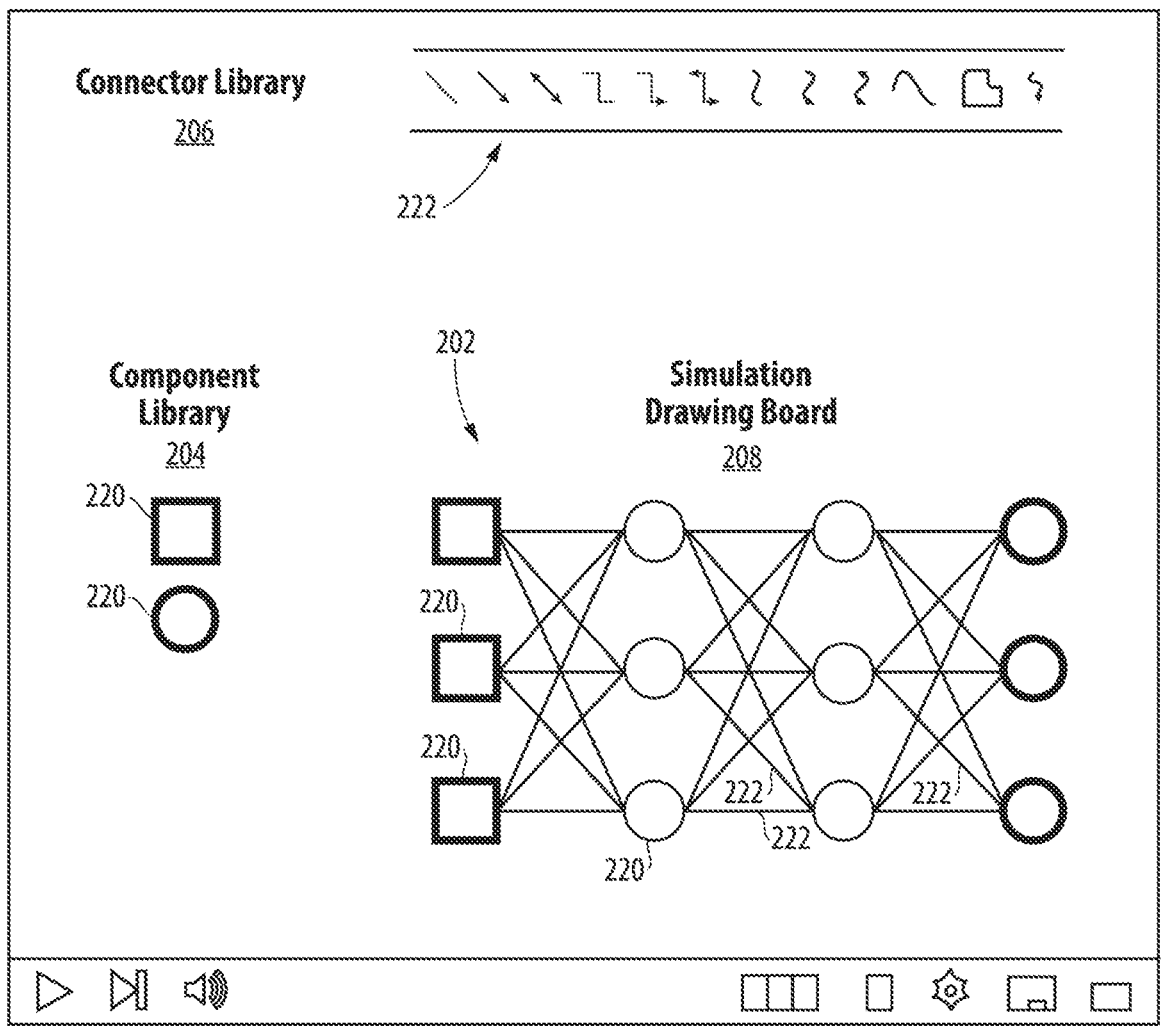
FIG. 2 is a block diagram illustrating an example screenshot displayed by the HMI for configuring the XR-HMI system shown in FIG. 1, in accordance with embodiments of the disclosure.

FIG. 2 shows a screen shot 200 of an example configurations in which a flow system is modeled by a flow diagram 202. Screenshot 200 is shown with a component library 204, a connector library 206, and a simulation drawing board 208. Component library 204 is loaded with a selection of components 220. Each component is associated with component configuration data that describes properties of the component that can affect potential connections with other components 220 and/or potentially affect flow to, through, or from the component 220. The component configuration data can include initial status data that indicates the initial status of the corresponding component 140. The component configuration data can be entered by an administrator and can be non-editable, or alternatively the operations operator can edit the component configuration data.

Connector library 206 provides a variety of connectors 222 for connecting two or components 220. The connectors 222 define relationship between components 220 for forming conduits via which the flow can pass. Each connector 222 is associated with connector configuration data that describes properties of the relationship or conduit that can affect components 220 connected to the connector 222 and/or potentially affect flow through the connector 222. The connector configuration data can include initial status data that indicates the initial status of the corresponding connection 142. The connector configuration data can be entered by an administrator and can be non-editable, or alternatively the operations operator can edit the connector configuration data.

The configuration operator can select one or more components 220 from component library 204 and/or one or more connectors 222 from connector library 206 and place them on simulation drawing board 208, such as by using a pointing device (e.g., a mouse or keyboard) to select, cut, paste, click, drag, and/or drop, or the equivalent, selected components 220 and connectors 222 relative to one another. Once all of the components 220 and connectors 222 for a flow system have been selected and placed on simulation drawing board 208 in a selected configuration, the user can instruct XR-HMI system 100 to generate a flow diagram and metadata based on the selections, and output a model of the components 220 and connectors 222 selected. The flow diagram and metadata can be received by simulation module engine 120 as configuration data. Metadata refers to internal data used to build the simulated flow system, such as how the different components 220 are connected to one another. This metadata allows the software to build a flow graph model of inter-component connections 222, which enables computations of the flow.

Figure 3:
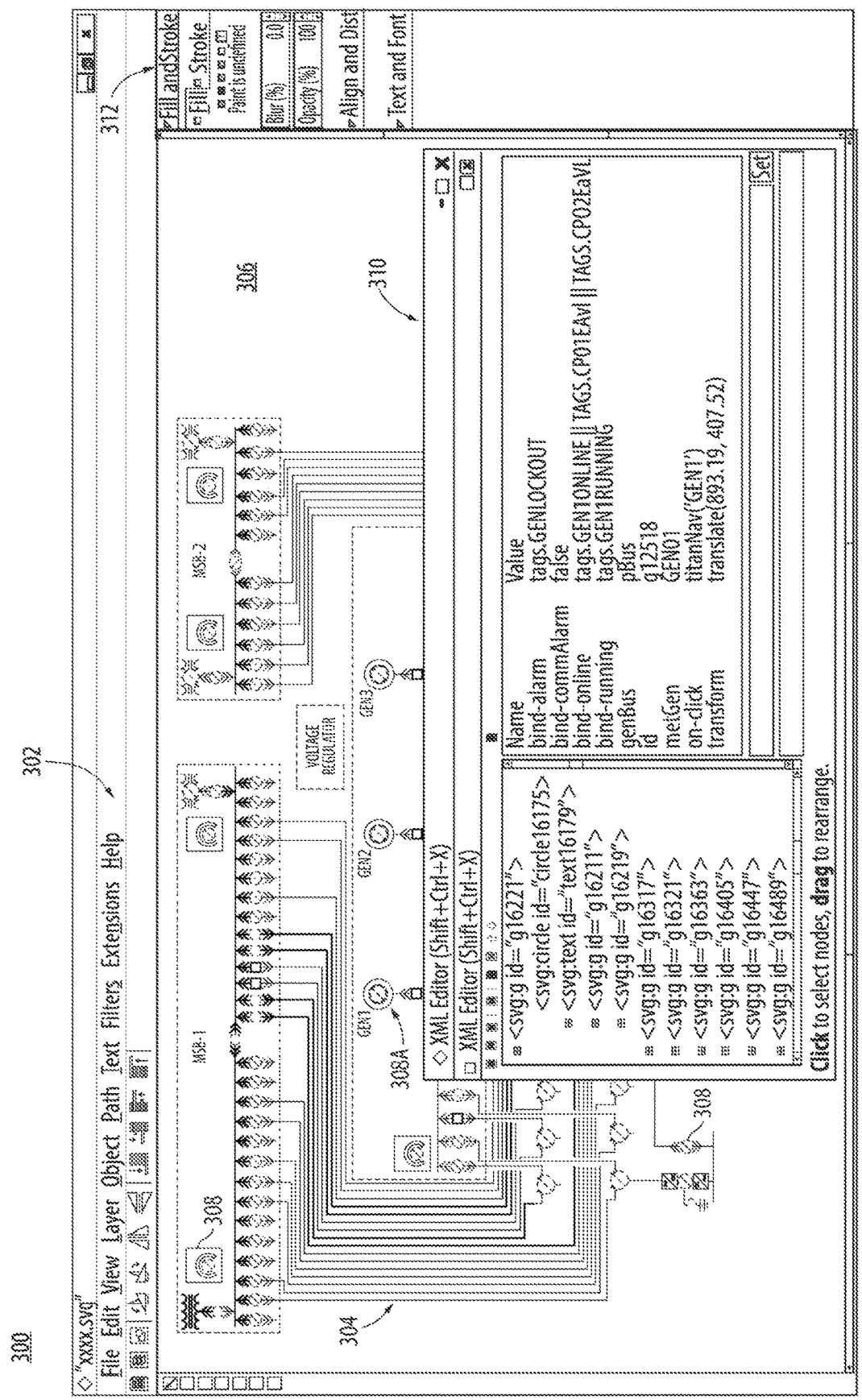
FIG. 3 is an example screenshot of a graphical tool provided by the XR-HMI system for configuring an example flow system, in accordance with embodiments of the disclosure.

FIG. 3 shows an example screenshot 300 of a graphical tool provided by configuration module 110. The graphical tool is operated by a user to configure a flow diagram 304 of a flow system. The user is able to lay out the flow diagram graphically via a drag and drop interface, which creates the graphical layout metadata. Each time the user drags and drops a graphical element shown as a node 308 that simulates a component 140, or creates a connection between nodes 308 to simulate actual connections 142, metadata is generated and associated with the corresponding node(s) 308 to represent the placement of the nodes 308 and connections between the nodes 308.

As shown, the graphical tool includes a graphical editor 302, which is a GUI that allows a user to assemble and edit a flow diagram 304 of the simulated flow system within a work area 306. The simulated flow system is used to calculate a flow graph model. Configuration user interface engine 112 allows the user to drag and drop nodes 308 into the work area 306 for creating the flow diagram 304 of the simulated system. Metadata module 114 allows a user to select a node. An example selected node 308A is shown. A metadata window 310 can be activated when the selected node 308A is selected (such as by right clicking, without limitation to a particular technique for selecting a graphical element). The metadata window 310 can be used to select metadata and add the selected metadata to the selected node 308. In a similar fashion, metadata can be added to a selected connection. The additional metadata helps configuration module 110 understand behavior of a flow along connections between nodes 108. Software artifacts are created when using the graphical tool to add, connect, and annotate nodes 308 with metadata. The software artifacts are then interpreted and used to make the flow graph model which is available during runtime.

Other methods for users to enter metadata can be provided by adjusting configuration files used to run XR-HMI system 100. In one or more embodiments, an integrated development environment having a drag/drop system is provided, wherein metadata is entered within the integrated development environment.

In one or more embodiments, input forms are provided for a user at any phase, e.g., an operator or end user. The input forms can be used to enter metadata information, via which resulting graphics and a simulated flow system can be automatically built.

In one or more embodiments, the simulated flow system can be graphically designed while operating in an extended reality environment.

Figure 4:
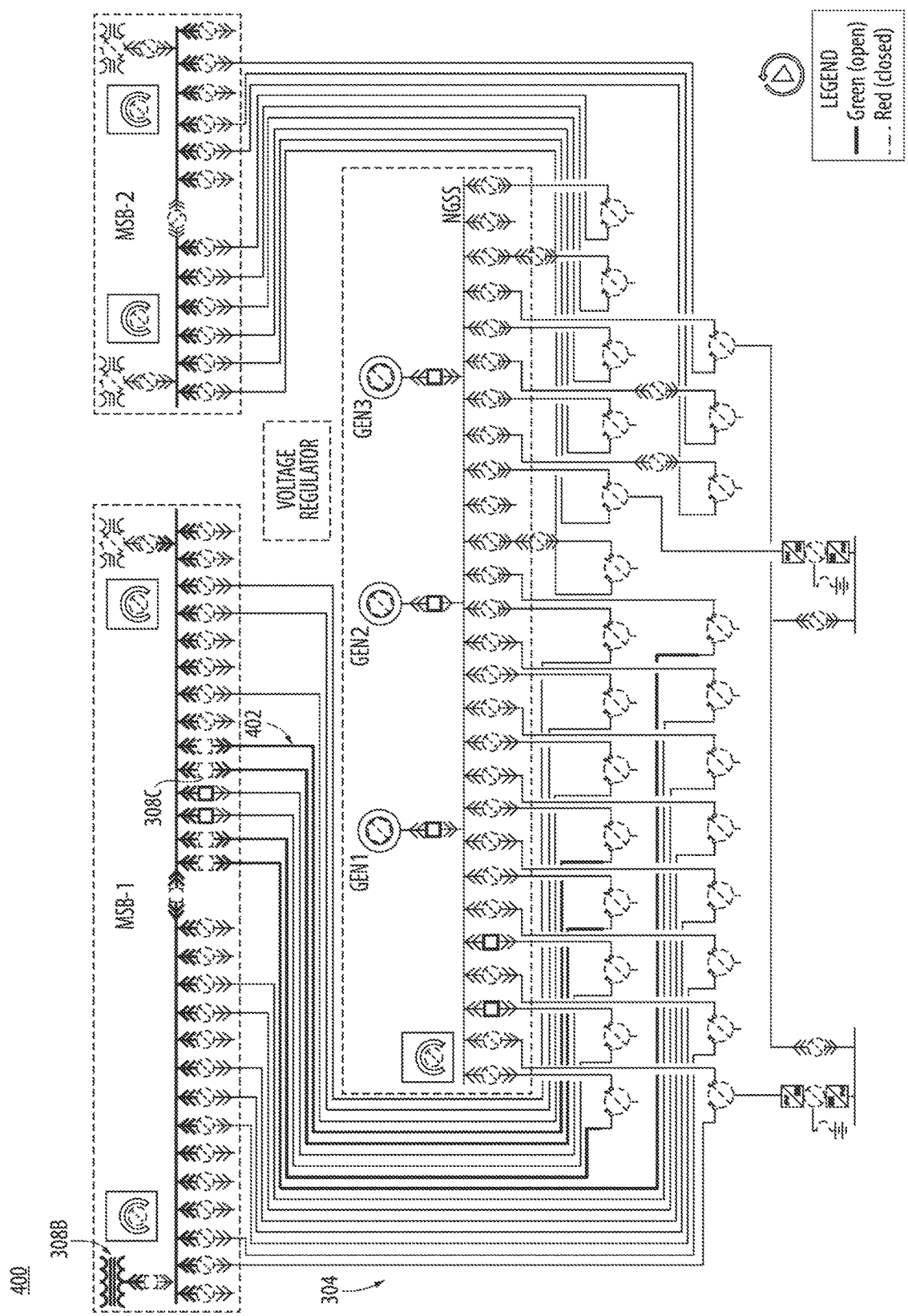
FIG. 4 is a portion of an example screenshot of the example flow system configured in FIG. 3 as modeled during runtime, in accordance with embodiments of the disclosure.

FIG. 4 shows a portion of an example screenshot 400 of the flow diagram 304 that was designed using the graphical tool as shown in FIG. 3 during runtime. The screenshot 400 is displayed by operations UI engine 122. During runtime, simulation module 120 uses real time data received via data interface 130 to determine the status of each node 308 in flow diagram 304, and further applies the calculated graph flow model to determine the flow status of all nodes 308 and connections to node 308. In this example, a single flow source node 308B is active, and therefore producing flow 402. There are several flow gates 308C attached via connectors. It can be seen that some of the gates 308C can be opened to pass the flow 402 through, while other gates 308C can be closed to not allow the flow 402 to pass through.

The initial status data associated with each component 220 and connector 222 can be used by simulation module engine 120 as the status data until it is updated by the input status data, actual status data, and/or playback status data and then used by simulation module engine 120. In this way, the status data can be dynamic and updatable by the input status data, actual status data, and/or playback status data either during operation of the actual flow system or during playback.

Figure 5:
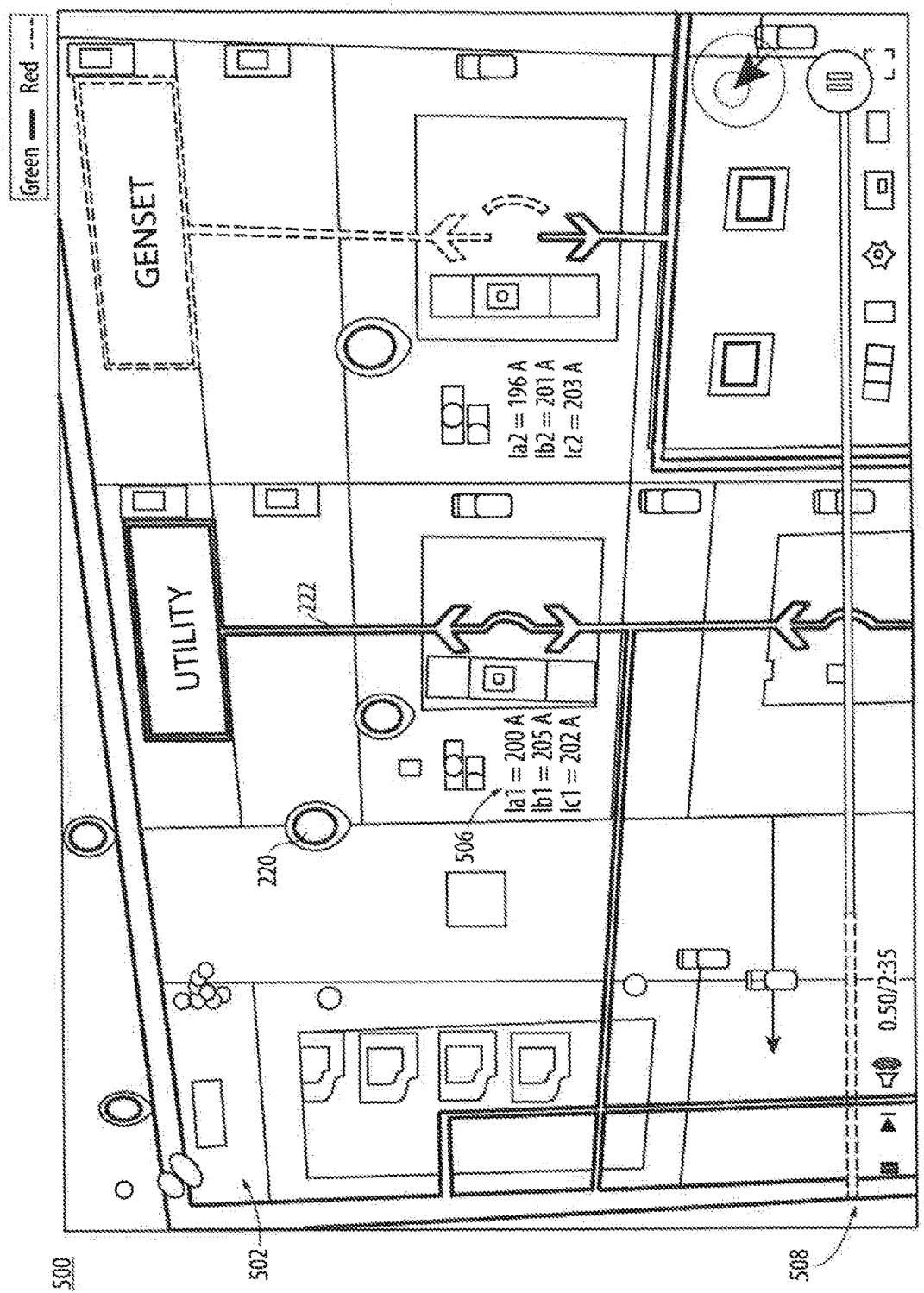
FIG. 5 is a block diagram illustrating an example screenshot displayed by the HMI of a simulation of the actual flow system, in accordance with embodiments of the disclosure.

With reference to FIGS. 2 and 5, a screenshot 500 is shown of display information output from XR-HMI engine 126 during playback of a simulation or actual session. The screenshot 500 is displayed by operations UI engine 122. Components 220 and connectors 222 are shown overlayed or superimposed on an image 502 of the actual flow system. A flow is shown along paths established by connectors 222. A graphical indicator (e.g., color or hashing, without limitation) is added to connectors 222, which indicates a source type of the flow that has reached that connector 222. In this example, the color green indicates the connector 222 has received Utility Power, and red indicates the connector 222 has received Generator Power. The connectors 222D and 222E surrounding the words "Genset" and "Utility," respectively, are a visual indicator that represents a type of source of flow into the flow system (wherein "Genset" represents a generator as the source and "Utility" represents a utility as the source. Additionally, a components below "Utility" and a component below "Genset" are each components that can allow or disallow the flow to pass through them in the flow system, depending on their actual status. The component below "Utility" is currently in a state to allow flow, while the component below "Genset" is in a state to not allow flow. As a result, the green flow passes into the rest of the flow system, while the red flow does not.

Actual data 506 is associated with the components 220, wherein the actual data is real time data monitored by the actual flow system 102 (shown in FIG. 1) for an associated component 220 displayed next to the actual data 506. In the example shown, actual data 506 is real time metering data. Actual data 506 can be displayed continuously or intermittently, such as on demand (e.g., in response to a right click on the corresponding graphically displayed component 220, connector 222, or flow to which it is associated. Timeline 508 shows a timeline of the playback. The timeline shows how much time of the playback has already been displayed, how much time is left, and can include graphical elements associated with user tools for playing the playback on the display, such as to control rewind, stop, pause, start, fast forward, play, etc.

The status of components 220 and connectors 222 can change at any time during operation of the actual flow system 102 or playback (on the fly) based on user input status data, actual status data, and playback status data, which can affect the dynamic flow. The changes in the status data and the flow are indicated on the display output by the XR-HMI engine 126 by the actual data 506.

Figure 6:
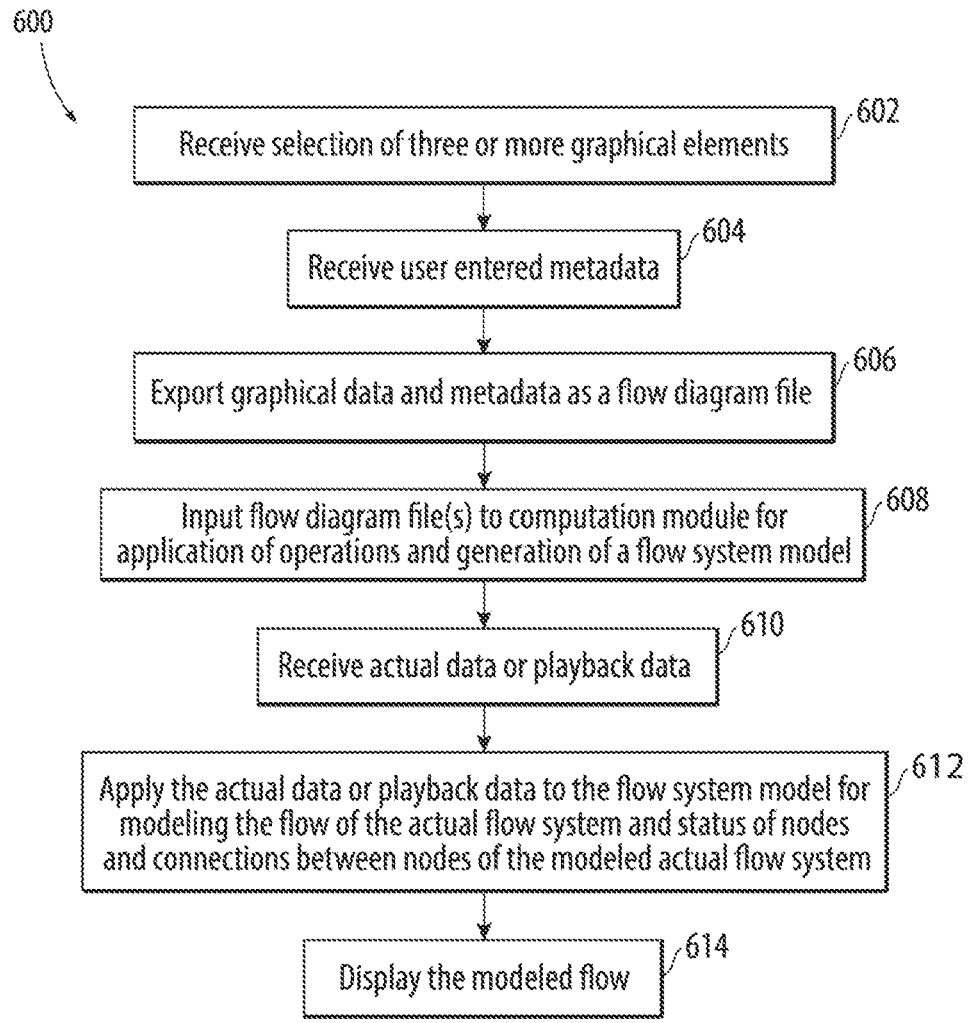
FIG. 6 is a flowchart of an example method of applying extended reality and an HMI to an actual flow system to simulate flow of an actual flow of the actual flow system, in accordance with embodiments of the disclosure.
Figure 7:
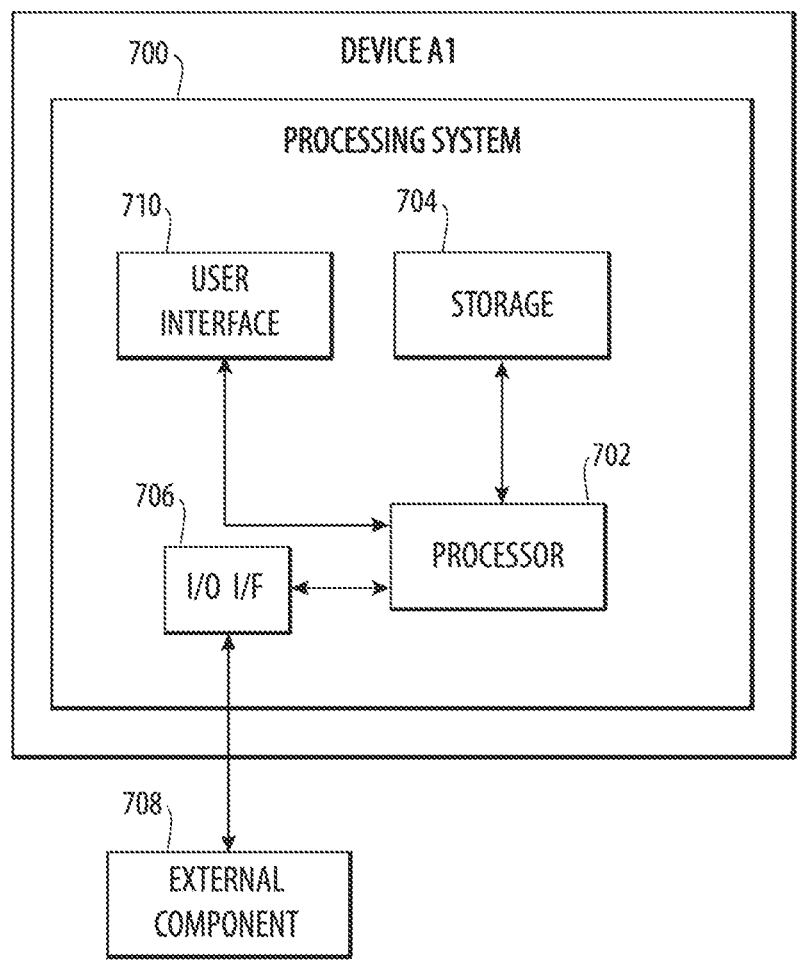
FIG. 7 is a block diagram of an exemplary computer system that implements components of the XR-HMI system shown in FIG. 1, in accordance with embodiments of the disclosure.

FIGS. 6 and 7 show exemplary and non-limiting flowcharts. The example methods can be performed by an HMI system using XR, such as XR-HMI system 100 shown in FIG. 1. Before turning to the description of FIGS. 6 and 7, it is noted that the flowcharts in FIGS. 6 and 7 show examples in which operational blocks are carried out in a particular order, as indicated by the lines connecting the blocks, but the various blocks shown in these flowcharts can be performed in a different order, or in a different combination or sub-combination. It should be appreciated that in some embodiments some of the blocks described below may be combined into a single block. In some embodiments, one or more additional blocks may be included. In some embodiments, one or more of the blocks can be omitted.

With reference to FIG. 6, flowchart 600 illustrates a method for applying extended reality to an actual flow system to model flow of an actual flow of the actual flow system, in accordance with certain illustrated embodiments. At block 602, selection of three or more graphical elements, such as components 220 shown in FIGS. 2 and 5) is received. A user can use a graphical editor (such as described with reference to FIG. 3) to visually place and arrange the graphical elements, each of which represents a node in the actual flow system. Placement can include selecting a graphical element, e.g., from a library, and dragging and dropping the graphical element onto a work area (such as work area 306 of FIG. 3). Graphical data is generated that represents the graphical elements At block 604, using the graphical editor or a simple text editor, the user enters metadata about each graphical element that describes any connections to other graphical elements. The user can draw connectors between the graphical elements or specify the connections by entering text. The metadata can include data bindings for binding a component to real time data, equipment information, and initial status data associated with the graphical elements, and connectors between graphical elements. At block 606, graphical data and metadata entered via the graphical editor and/or text editor is exported as a flow diagram file, with each graphical element representing a node of the actual flow system.

At block 608, one or more flow diagram files are input to a computation module, such as computation module 124 shown in FIG. 1. The computation module applies operations to the graphical data and metadata of the flow diagram file(s) to provide a flow system model that models the actual flow system.

At block 610, actual data or playback data is received about actual components and connectors. The actual data or playback data can include, for example, metered data that was actually measured or simulated and/or played back.

At block 612, the actual data or playback data is applied to the flow system model that outputs a modeled path, direction, velocity, and/or source of a modeled flow of the actual flow system and status of nodes and connections between nodes of the modeled actual flow system.

At block 614, the modeled flow is displayed, such as by XR-HMI engine 126 shown in FIG. 1. In the display, statuses of the nodes and connections between nodes are indicated visually to the user via applying color to each node and connector to indicate the presence and type of flow.

In one or more embodiments, the components and connections and their metadata can be received from a pre-existing diagram, e.g., a floor map or the equivalent. The diagram and/or additional files can be imported are formatted in a predetermined format that the XR-HMI system 100 can understand and include information and metadata that can be used to automatically build a simulated flow system from the diagram.

With reference to FIG. 7, a block diagram of an example computing system 700 is shown, which provides an example configuration of the processing components of XR-HMI system 100. Additionally, all or portions of the processing components of XR-HMI system 100 could be configured as software, and computing system 700 could represent such portions. Computing system 700 is only one example of a suitable system and is not intended to suggest any limitation as to the scope of use or functionality of embodiments of the disclosure described herein. Computing system 700 can be implemented using hardware, software, and/or firmware. Regardless, computing system 700 is capable of being implemented and/or performing functionality as set forth in the disclosure.

Computing system 700 is shown in the form of a general-purpose computing device. Computing system 700 includes a processing device 702, memory 704, an input/output (I/O) interface (I/F) 706 that can communicate with an internal component, such as a UI 710 (e.g., for implementing UI 110 shown in FIG. 1), and optionally an external component 708.

The processing device 702 can include, for example, a programmable logic device (PLD), microprocessor, DSP, a microcontroller, an FPGA, an ASIC, and/or other discrete or integrated logic circuitry having similar processing capabilities.

The processing device 702 and the memory 704 can be included in components provided in the FPGA, ASIC, microcontroller, or microprocessor, for example. Memory 704 can include, for example, volatile and non-volatile memory for storing data temporarily or long term, and for storing programmable instructions executable by the processing device 702. Memory 704 can be a removable (e.g., portable) memory for storage of program instructions. I/O I/F 706 can include an interface and/or conductors to couple to the one or more internal components 710 and/or external components 708.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flow diagram and/or block diagram block or blocks.

The computer program instructions may also be loaded onto a computer, other programmable data processing apparatus, or other devices to cause a series of operational operations to be performed on the computer, other programmable apparatus or other devices to produce a computer implemented process such that the instructions which execute on the computer or other programmable apparatus provide processes for implementing the functions/acts specified in the block diagram block or blocks.

Embodiments of the processing components of XR-HMI system 100 may be implemented or executed by one or more computer systems, such as a microprocessor. Each computer system 700 can be included within processing components of ER HMI system 100, or multiple instances thereof. In the example shown, computer system 700 is embedded in the processing components of XR-HMI system 100. In various embodiments, computer system 700 may include one or more of a microprocessor, an FPGA, application specific integrated circuit (ASIC), microcontroller. The computer system 700 can be provided as an embedded device.

Computer system 700 is only one example of a suitable system and is not intended to suggest any limitation as to the scope of use or functionality of embodiments of the disclosure described herein. Regardless, computer system 700 is capable of being implemented and/or performing any of the functionality set forth hereinabove.

Computer system 700 may be described in the general context of computer system-executable instructions, such as program modules, being executed by a computer system. Generally, program modules may include routines, programs, objects, components, logic, data structures, and so on that perform particular tasks or implement particular abstract data types.

In the preceding, reference is made to various embodiments. However, the scope of the present disclosure is not limited to the specific described embodiments. Instead, any combination of the described features and elements, whether related to different embodiments or not, is contemplated to implement and practice contemplated embodiments. Furthermore, although embodiments may achieve advantages over other possible solutions or over the prior art, whether or not a particular advantage is achieved by a given embodiment is not limiting of the scope of the present disclosure.

Thus, the preceding aspects, features, embodiments and advantages are merely illustrative and are not considered elements or limitations of the appended claims except where explicitly recited in a claim(s).

The various embodiments disclosed herein may be implemented as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer-readable medium(s) having computer-readable program code embodied thereon.

Any combination of one or more computer-readable medium(s) may be utilized. The computer-readable medium may be a non-transitory computer-readable medium. A non-transitory computer-readable medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer-readable medium can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages. Moreover, such computer program code can execute using a single computer system or by multiple computer systems communicating with one another (e.g., using a local area network (LAN), wide area network (WAN), the Internet, etc.). While various features in the preceding are described with reference to flowchart illustrations and/or block diagrams, a person of ordinary skill in the art will understand that each block of the flowchart illustrations and/or block diagrams, as well as combinations of blocks in the flowchart illustrations and/or block diagrams, can be implemented by computer logic (e.g., computer program instructions, hardware logic, a combination of the two, etc.). Generally, computer program instructions may be provided to a processor(s) of a general-purpose computer, special-purpose computer, or other programmable data processing apparatus. Moreover, the execution of such computer program instructions using the processor(s) produces a machine that can carry out a function(s) or act(s) specified in the flowchart and/or block diagram block or blocks.

The flowchart and block diagrams in the Figures illustrate the architecture, functionality and/or operation of possible implementations of various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is to be understood that the above description is intended to be illustrative, and not restrictive. Many other implementation examples are apparent upon reading and understanding the above description. Although the disclosure describes specific examples, it is recognized that the systems and methods of the disclosure are not limited to the examples described herein, but may be practiced with modifications within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

The invention claimed is:

1. A method of applying extended reality to an actual flow system to simulate an actual flow of the actual flow system, the method comprising:
   receiving, by a set of operations of a computation module, graphical elements of a flow diagram and metadata, the graphical elements of the flow diagram including a selection of a combination of graphical components and graphical flow connections between the graphical components for corresponding to the actual flow system, the selection of the combination of the graphical components and the graphical flow connections being selected from a plurality of possible graphical components and a plurality of possible graphical flow connections, the metadata being based on deductions about the graphical flow connections, and the set of operations including mathematical operations;
   applying the set of operations of the computation module to the combination of the graphical components and the graphical flow connections and the metadata to generate a simulated flow, wherein applying the set of operations includes handling potential combinations of selections of graphical components and graphical flow connections and potential combinations of dynamic conditions, the dynamic conditions including a user-update to input status data as updated over time for causing a change in status of the graphical components and the graphical flow connections included in the combination, received actual status data that affects an actual flow of the actual flow system over time, and received metering data that characterizes the actual flow over time; and
   outputting by an extended-reality human machine interface (XR-HMI) a display of the simulated flow over time.

2. The method of claim 1, further comprising receiving the selection of the combination of the graphical components and the graphical flow connections via a graphical user interface (GUI).

3. The method of claim 1, wherein the graphical components of the selection of the combination of the graphical components and the graphical flow connections include a source component corresponding to an actual source component that is a source of the actual flow of the actual flow system, and applying the set of operations includes treating the source component as a source for the simulated flow.

4. The method of claim 1, wherein the metadata deductions are further based on an initial status of the selection of the combination of graphical components and graphical flow connections as closed or open and are further based on data bindings for binding the actual status data to the selection of the combination of graphical components and graphical flow connections and/or information about associated equipment.

5. The method of claim 1, wherein the metadata represents direction of a potential simulated flow and rate of flow of the potential simulated flow.

6. The method of claim 1, wherein applying the set of operations to generate the simulated flow, further includes determining one or more paths, direction, source of, and velocity of the simulated flow.

7. The method of claim 1, wherein the set of operations further include at least one of the group comprising machine learning operations, statistical operations, and artificial intelligence operations.

8. The method of claim 2, further comprising:
receiving the simulated components by detecting two or more user simulated component selections from a library of available simulated components provided via the GUI;
displaying the two or more user simulated components; and
receiving the simulated graphical flow connections by detecting a user action via the GUI that connects components of the two or more user simulated components.

9. The method of claim 1, further comprising receiving the actual status data in real time via an interface with the actual flow system or receiving the actual status data as playback data.

10. The method of claim 1, further comprising:
comparing the simulated flow to a timeline history based on playback of the metering data; and
diagnosing and/or optimizing the actual flow system having the actual flow based on a result of the comparing.

11. A modular extended reality human-machine interface (XR-HMI) system, the modular XR-HMI system comprising:
at least one memory storing programmable instructions; and
at least one processor disposed in communication with the at least one memory, the at least one processor upon execution of the programmable instructions being caused to:
receive, by a set of operations of a computation module, graphical elements of a flow diagram and metadata, the graphical elements of the flow diagram including a selection of a combination of graphical components and graphical flow connections between the graphical components for corresponding to an actual flow system, the selection of the combination of the graphical components and the graphical flow connections being selected from a plurality of possible graphical components and a plurality of possible graphical flow connections, the metadata being based on deductions about the graphical flow connections, and the set of operations including mathematical operations;
apply the set of operations of the computation module to the combination of the graphical components and the graphical flow connections and the metadata to generate a simulated flow, wherein applying the set of operations includes handling potential combinations of selections of graphical components and graphical flow connections and potential combinations of dynamic conditions, the dynamic conditions including a user-update to input status data as updated over time for causing a change in status of the graphical components and the graphical flow connections included in the combination, received actual status data that affects an actual flow of the actual flow system over time, and received metering data that characterizes the actual flow over time; and
output a display of the simulated flow over time.

12. The modular XR-HMI system of claim 11, wherein the selection of graphical components includes a source component corresponding to an actual source component that is a source of the actual flow of the actual flow system, and applying the set of operations includes treating the source component of the selection of graphical components as a source for the simulated flow, metadata associated with the source component representing characteristics of the actual source component that affect the simulated flow from the actual source component.

13. The modular XR-HMI system of claim 12, the at least one processor, upon execution of the programmable instructions, being further configured to:
receive the simulated components by detecting two or more user simulated component selections from a library of available simulated components provided via a graphical user interface (GUI);
display the two or more user simulated components; and
receive the simulated graphical flow connections by detecting a user action via the GUI that connects components of the two or more user simulated components.

14. The modular XR-HMI system of claim 11, wherein the metadata further represents an initial status of the selection of the combination of graphical components and graphical flow connections as closed or open with regards to the simulated flow, data bindings for binding the actual status data to the selection of the combination of graphical components and graphical flow connections, and/or information about associated equipment.

15. The modular XR-HMI system of claim 11, wherein the metadata represents direction of a potential simulated flow and rate of flow of the potential simulated flow.

16. The modular XR-HMI system of claim 11, wherein applying the set of operations to generate the simulated flow includes determining one or more paths, direction, source of, and velocity of the simulated flow.

17. The modular XR-HMI system of claim 11, wherein the set of operations further include at least one of the group comprising machine learning operations, statistical operations, and artificial intelligence operations.

18. The modular XR-HMI system of claim 11, the at least one processor, upon execution of the programmable instructions, being further configured to receive in real time the actual status data via an interface with the actual flow system or receive the actual status data as playback data.

19. A non-transitory computer readable storage medium having one or more computer programs embedded therein, which when executed by a computer system, cause the computer system to:
receive, by a set of operations of a computation module, graphical elements of a flow diagram and metadata, the graphical elements of the flow diagram including a selection of a combination of graphical components and graphical flow connections between the graphical components for corresponding to an actual flow system, the selection of the combination of the graphical components and the graphical flow connections being selected from a plurality of possible graphical components and a plurality of possible graphical flow connections, the metadata being based on deductions about the graphical flow connections, and the set of operations including mathematical operations;

apply the set of operations of the computation module to the combination of the graphical components and the graphical flow connections and the metadata to generate a simulated flow, wherein applying the set of operations includes handling potential combinations of selections of graphical components and graphical flow connections and potential combinations of dynamic conditions, the dynamic conditions including a user-update to input status data as updated over time for causing a change in status of the graphical components and the graphical flow connections included in the combination, received actual status data that affects an actual flow of the actual flow system over time, and received metering data that characterizes the actual flow over time; and output by an extended-reality human machine interface (XR-HMI) a display of the simulated flow over time.

20. The non-transitory computer readable storage medium of claim 19, the computer system being further caused to:

compare the simulated flow to a timeline history based on playback of the metering data; and diagnose and/or optimize the actual flow system having the actual flow based on a result of the comparing.

\* \* \* \* \*